(12) United States Patent
Slusarczyk et al.

(10) Patent No.: US 8,919,505 B2
(45) Date of Patent: Dec. 30, 2014

(54) HYDRAULIC SUSPENSION DAMPER

(75) Inventors: Pawel Slusarczyk, Myslenice (PL);
Waldemar Widla, Cracow (PL);
Sebastian Kaffanke, Skawina (PL)

(73) Assignee: BWI Company Limited S.A.,
Luxembourg (LU)

( * ) Notice: Subject to any disclaimer, the term of this patent is extended or adjusted under 35 U.S.C. 154(b) by 186 days.

(21) Appl. No.: 12/882,340

(22) Filed: Sep. 15, 2010

(65) Prior Publication Data
US 2011/0031077 A1    Feb. 10, 2011

(30) Foreign Application Priority Data

Mar. 23, 2009    (EP) .................................... 09004094

(51) Int. Cl.
*F16F 9/34*       (2006.01)
*F16F 9/348*      (2006.01)
*F16F 9/512*      (2006.01)

(52) U.S. Cl.
CPC ............... *F16F 9/3485* (2013.01); *F16F 9/512* (2013.01)
USPC ................ 188/322.15; 188/282.8; 188/282.5; 188/322.18

(58) Field of Classification Search
USPC .............. 188/322.15, 282.8, 280, 281, 282.4, 188/282.5, 275, 322.18
See application file for complete search history.

(56) References Cited

U.S. PATENT DOCUMENTS

| | | | | |
|---|---|---|---|---|
| 4,768,629 A | * | 9/1988 | Wossner | 188/284 |
| 4,971,180 A | * | 11/1990 | Kobayashi et al. | 188/282.4 |
| 5,219,414 A | * | 6/1993 | Yamaoka | 188/284 |
| 5,730,260 A | * | 3/1998 | Thyssen | 188/266.5 |
| 5,785,160 A | * | 7/1998 | Grundei | 188/322.15 |
| 6,176,492 B1 | * | 1/2001 | Sawai | 277/461 |
| 6,230,858 B1 | | 5/2001 | Moradmand et al. | |
| 6,364,075 B1 | | 4/2002 | Lemmens et al. | |
| 6,651,787 B2 | * | 11/2003 | Grundei | 188/280 |
| 6,886,670 B2 | | 5/2005 | Holiviers et al. | |
| 6,913,128 B2 | * | 7/2005 | Muller | 188/322.15 |
| 7,011,191 B2 | | 3/2006 | Spicer et al. | |

(Continued)

*Primary Examiner* — Thomas Irvin
(74) *Attorney, Agent, or Firm* — Dickinson Wright PLLC

(57) ABSTRACT

The invention relates to a hydraulic damper (1), in particular for the suspension system of a motor vehicle comprising a tube (2) filled with working liquid, inside of which a slidable piston assembly (3) is placed. To increase an amount of dissipated energy during extremely fast compression strokes, the damper (1) is provided with an additional compression valve system (17a), preferably in a form of a preassembled add-on device, which is attached to the piston rod (4) in a compression chamber (10) and comprises a hollow main body (18a) surrounding the piston rod (4) and provided with a substantially flat first abutment surface (19) with a radially inner portion and a radially outer portion defining the close position of the system (17a), and at least one channel (20) the inlet of which is located within the area of the first abutment surface (19), a compression spring (24) supported within the hollow main body (18a) underneath the first abutment surface (19), a substantially rigid and relatively thin plate (26a) biased by the spring (24) against a second abutment surface (27) defining the open position of the system (17a), wherein the plate is free to deflect and displace between said open position and said close position, and the outside diameter of said hollow main body (18a) is less than the inner diameter of the tube (2) and the hollow main body (18a) is provided with an annular groove (21) inside of which a cross-cut ring (22) is disposed to form a sliding fit of the hollow main body (18) within the tube (2).

11 Claims, 4 Drawing Sheets

(56) References Cited

U.S. PATENT DOCUMENTS

| | | |
|---|---|---|
| 7,097,016 B2 | 8/2006 | Deferme |
| 7,104,369 B2 | 9/2006 | Heyn et al. |
| 7,111,711 B2 | 9/2006 | Grundei |
| 7,290,643 B2 | 11/2007 | Fujita et al. |
| 7,370,866 B2 * | 5/2008 | Zitting et al. .................. 277/436 |
| 7,438,164 B2 | 10/2008 | Groves et al. |
| 8,066,105 B2 * | 11/2011 | Maniowski et al. ..... 188/322.15 |
| 2004/0245058 A1 | 12/2004 | Diederich et al. |
| 2008/0121478 A1 * | 5/2008 | Maniowski et al. ....... 188/282.6 |
| 2008/0149438 A1 | 6/2008 | Chikamatsu et al. |
| 2009/0065316 A1 | 3/2009 | Chen |
| 2009/0321203 A1 * | 12/2009 | Widla et al. .............. 188/322.15 |

* cited by examiner

HYDRAULIC SUSPENSION DAMPER

TECHNICAL FIELD

The present invention relates to a hydraulic damper, in particular to a hydraulic damper for the suspension system of a motor vehicle.

BACKGROUND OF THE INVENTION

Hydraulic suspension dampers typically comprise a tube filled with working liquid, inside of which a slidable piston assembly is placed. The piston assembly is attached to a piston rod led outside the damper through the piston rod guide, and comprises a piston with rebound and compression valve assemblies, which control the flow of working liquid passing through the piston assembly during the rebound and the compression stroke of the damper. Some dampers comprise also a base (bottom) valve assembly with separate rebound and compression valve assemblies controlling the flow of working liquid passing in and out of the compensation chamber, usually formed between the inner and the outer tube of the damper.

Each valve assembly usually comprises a stack of resilient disks, often with an additional compression spring, covering the flow passages of the piston and acting as one way valve, deflecting or moving under the pressure of the working liquid to allow the flow. Number, shape, diameter, and thickness of each disk provide, among others, an adjustable compression and rebound damping forces.

Typical damper characteristic of damping force vs. piston velocity is a trade-off between improvement of the car handling properties and reduction of the unwanted car vibrations (a so called NVH—Noise-Vibration-Harshness requirements). Although dampers featuring low compression forces with degressive characteristics are required to improve the passengers comfort, during severe road and/or drive conditions they also often lead to maximally admissible wheel-knuckle displacements in damper compression direction leading to a suspension closure or jounce bumper engagement, which in turn affects the car safety, comfort, durability, and noise issues.

From the state of art, there are known dampers in which the damper compression force increases rapidly after reaching a certain velocity of the piston relative to the damper tube.

An exemplary damper of this type, disclosed in patent specification EP 1 215 414 B1, comprises a valve body fixed to the piston rod and urged away from a valve seat surface, formed on the piston, by a spring. The valve body has a conical surface which moves toward the valve seat surface as a function of dynamic pressure of a damping medium, bearing against the circular valve seat surface and making a linear contact in a closed position. The valve body is made of a plastic material and its outer diameter corresponds to the diameter of the damper tube. To prevent undefined leakage flows the valve body is sealed to the piston rod.

Another damping unit of this type, to be employed in particular for damping the movement of the vehicle steering device, is disclosed in patent specification EP 0 409 094 B1. The unit comprises two annular valve members allocated to each side of valve seat faces of the piston and urged towards the respective opening positions by a plurality of compression springs provided within axial bores of the piston, wherein at least one face of a pair of the piston valve seat face and the valve face allocated to each other is provided with axial projections and recesses, which in a damping position provides a restricted flow communication for working liquid.

Yet another damper having an additional damper valve is disclosed in patent specification EP 1 538 367 B1. This damper comprises a multipart control slide with a pressure-actuated surface, which can move in a closing direction to close a throttle, where the throttle point is determined by the outside diameter of the control slide and an inside wall of the damper tube. The control slide of this invention must be manufactured very precisely in order to achieve its proper operation and to minimize this issue it has a plastically deformable adjusting area.

U.S. Pat. No. 6,318,523 discloses a piston valve assembly for regulating the flow of working liquid of a mono-tube vehicle damper comprising a blow-off valve secured to the piston and having a hollow cylindrical portion with a flange extending transversely from an end thereof and biased toward and abutting an outer annular seat engaged by a helical spring in order to bias the blow-off valve to a closed position.

SUMMARY OF THE INVENTION

There is an object of the present invention is to provide an additional compression valve system for existing suspension dampers, which might be employed as an add-on device of a piston assembly, would comprise only a few simple components and would share comparable working characteristic within a large range of their dimensional tolerances in order to minimize the production specific losses, decreasing the costs of large scale production.

Yet another object of the invention is to provide a suspension-damper system which would beneficially increase an amount of dissipated energy during extremely fast compression strokes, would provide easy tuning of the engagement velocities and force gains as compared to known designs affecting neither tuning options of regular rebound and compression valve assemblies nor the performance of the damper in normal operating range of the piston velocities.

In order to accomplish the aforementioned and other objects, a damper of the kind mentioned in the outset, according to the present invention is provided with an additional compression valve system which is attached to the piston rod in a compression chamber and comprises a hollow main body surrounding the piston rod and provided with a substantially flat first abutment surface with a radially inner portion and a radially outer portion, in a plane substantially perpendicular to the damper longitudinal axis, defining the close position of the system, and at least one channel the inlet of which is located within the area of the first abutment surface, a compression spring supported within the hollow main body underneath the first abutment surface, a substantially rigid and relatively thin plate biased by the spring against a second abutment surface, in a plane substantially perpendicular to the damper longitudinal axis, defining the open position of the system, wherein the plate is free to deflect and displace between said open position to allow free flow of working liquid through said at least one channel of the hollow main body, and said close position to substantially restrict the flow of working liquid through said channels, and the outside diameter of said hollow main body is less than the inner diameter of the tube and the hollow main body is provided with an annular groove inside of which a cross-cut ring is disposed to form a sliding fit of the hollow main body within the damper tube.

The valve system of this kind forms one-way, normally open, quick-closing throttling valve which is independent on the piston position and dependent only on the piston velocity. It comprises only a few additional components, which are installed in series with the regular compression valve assembly and provide easy tuning of the engagement velocities and force gains. Its design enables substantially unrestricted flow of working medium in normal operating range of piston velocities.

The cross-cut ring on one hand slidably seals the hollow main body within the tube, so that the working medium flows only through the channels of the hollow main body, while on the other hand, by being to some extent free to displace inside the annular groove in a plane perpendicular to the damper longitudinal axis, it prevents over-rigidity of the damper construction, thus decreasing the loads acting on the piston assembly and the piston rod guide, and extending the working life of such a damper in comparison with an alternative slidably sealed but over-rigid construction.

Preferably the additional compression valve system has a form of a preassembled add-on device, which is supplied as a single unit to the production line. Preferably said second abutment surface is formed by a retaining nut passing through the plate.

In an alternative, preferred embodiment the hollow main body is provided with radially external axially projecting wall surrounding the plate and provided with means defining the second abutment surface.

Said movable plate may also be provided with a number of radially extending sections located above a number of the inlets of said channels of the hollow main body.

Preferably said plate and/or said hollow main body is/are provided with at least one passage for a flow of working liquid in said system close position.

Preferably said additional compression valve system is screwed on an external thread of the piston rod end, and n such a case said retaining nut and/or said hollow main body is preferably provided with a torque application surface.

BRIEF DESCRIPTION OF THE DRAWINGS

The other features of the invention shall be presented below in exemplary embodiments and in connection with the attached drawings on which.

Figure 1:
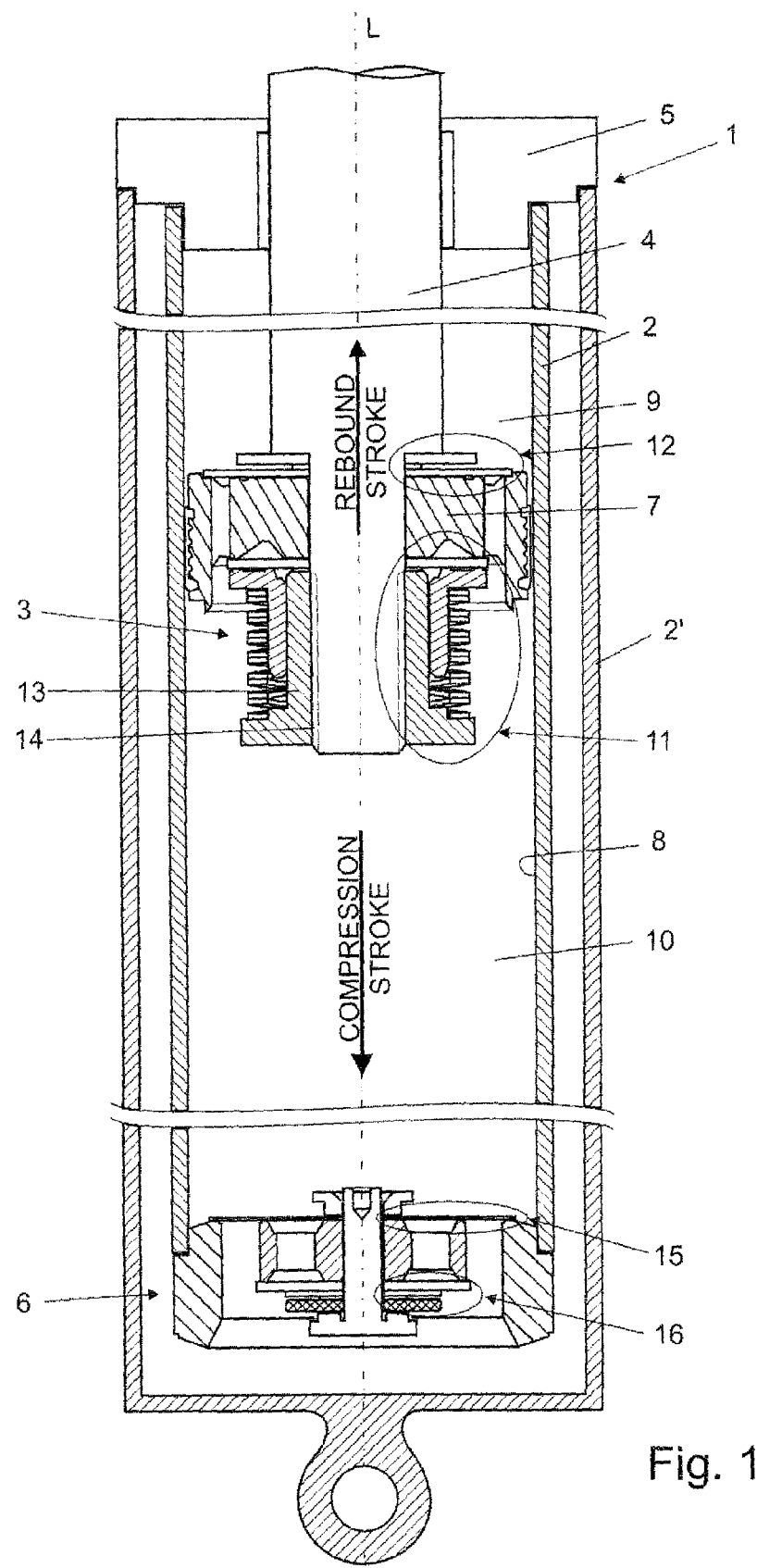
FIG. 1 is a schematic cross-sectional view of a typical twin-tube hydraulic suspension damper.

The hydraulic damper 1 shown in FIG. 1 is an example of a twin-tube damper comprising an internal tube 2 and an outer tube 2'. Inside the tube 2, filled with a working liquid, a movable piston assembly 3 is placed. The piston assembly is attached to a piston rod 4, led axially outside the damper 1 through a sealed piston rod guide 5. The tube 2 is closed at the other end by the base valve assembly 6.

The piston 7 makes a sliding fit with the inner surface 8 of the tube 2 and divides the tube 2 into a rebound chamber 9 and a compression chamber 10. The piston assembly 3 further comprises rebound and compression valve assemblies 11 and 12 with appropriate flow passages to control the flow of working liquid passing through the piston 7 during the rebound and the compression stroke in order to damp reciprocating movement of the piston 7 with the piston rod 4 relative to the tube 2. In this embodiment the piston assembly 3 is secured to the piston rod 4 by a threaded sleeve 13 of the rebound valve assembly 11, screwed on an external thread 14 of the piston rod 4 end.

The base valve assembly 6 is also provided with rebound 15 and compression 16 valve assemblies with appropriate flow passages, to control the flow of working liquid passing between the compression and the compensation chamber formed between the inner 2 and the outer tube 2' of the damper 1.

The hydraulic shock absorber of this kind with fully tuneable rebound (11, 15) and compression (12, 16) valve assemblies of the piston assembly 3 and the base valve assembly 6 is commonly used as a part of a motor vehicle suspension.

Figure 2:
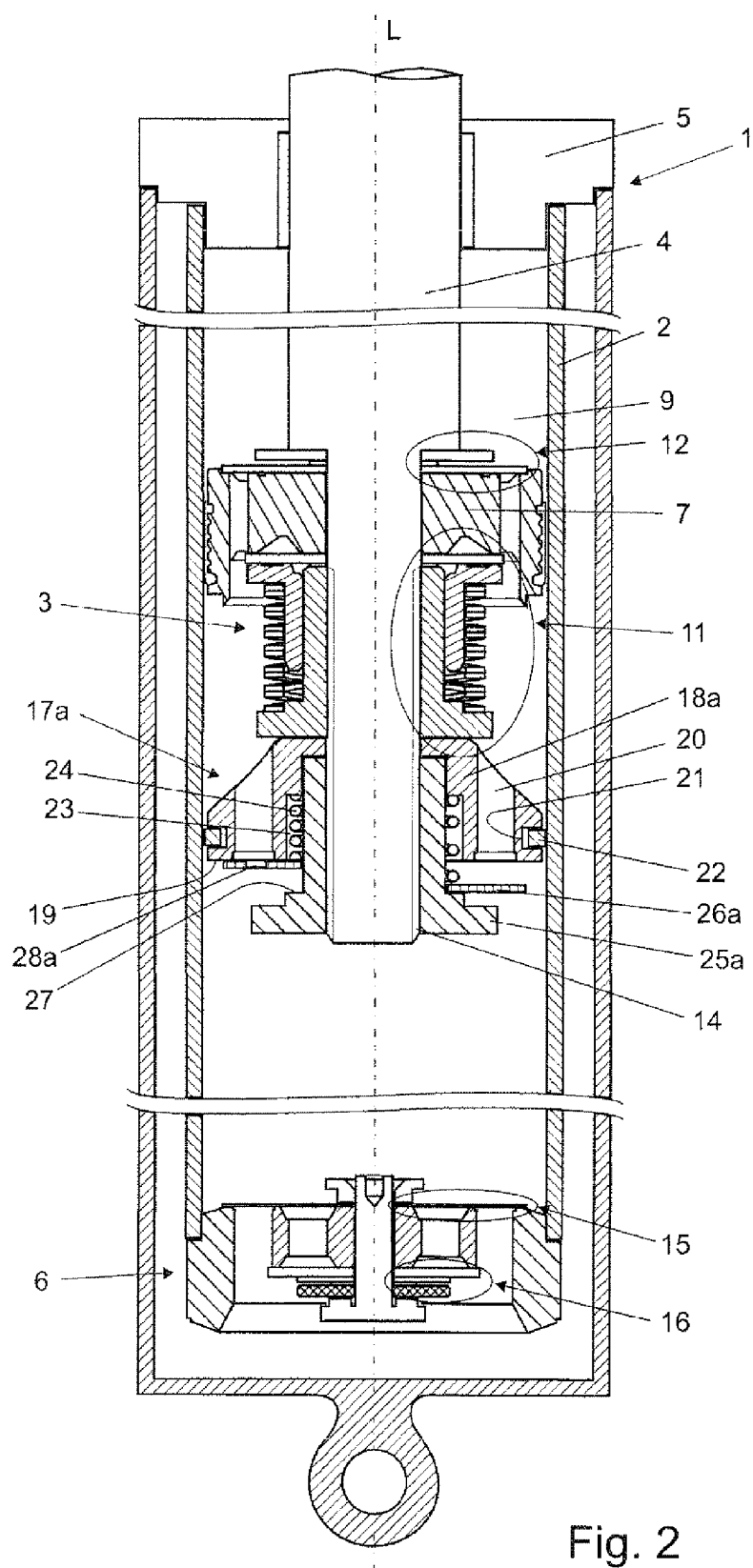
FIG. 2 is a schematic cross-sectional view of a hydraulic damper shown in FIG. 1 which has been supplemented with an additional compression valve system according to an embodiment of the present invention showing its two terminal working positions.
Figure 3:
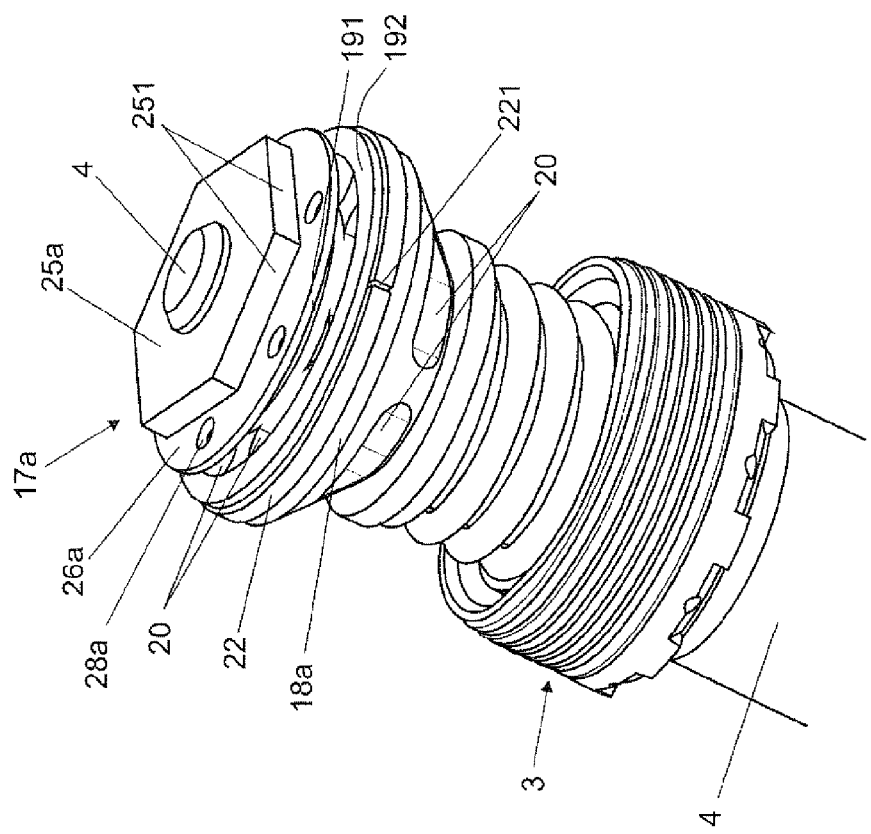
FIG. 3 is an axonometric top view of the additional valve system shown in FIG. 2.

FIG. 2 shows the damper, improved by application of an additional compression valve system 17a made according to the principles of the present invention in closed (first) and normally opened (second) position respectively on the left and on the right side of the damper longitudinal axis L, while FIG. 3 shows the additional compression valve system 17a in an axonometric view an in opened position, but outside of the tube and installed on a different piston assembly.

The valve system 17a comprises a hollow main body 18a surrounding the piston rod 4 and having a substantially flat first abutment surface 19 with a radially inner portion 191 and a radially outer portion 192 in a plane perpendicular to the damper longitudinal axis L. The hollow main body 18a is also provided with a number of equiangularly spaced channels 20 substantially parallel to the damper longitudinal axis L, the compression inlets of which are located within the area of the first abutment surface 19.

The hollow main body 18a has an outside diameter less than the inner diameter of the tube 2 and is provided with an annular groove 21 inside of which a floating ring 22 is disposed with a cross-cut 221. The ring 22 substantially seals the hollow main body 18a within the tube 2 forming the sliding fit, while the clearance between the main body 18a and the inner surface 8 of tube 2 is provided to compensate possible geometrical deviations of inner diameter of the tube 2 along the damper longitudinal axis L, as well as to prevent possible direct contact of the main body 18a and the inner surface 8 of tube 2, which might occur in particular in the case of bending moments acting on the damper 1. Thanks to the cross-cut 221 and appropriate dimensions of the ring 22, it is to some extent free to displace within the annular groove 21 in a plane perpendicular to the damper longitudinal axis L which further ensures that the damper construction is not over-rigid.

The hollow main body 18a is further provided with an internal socket 23 inside of which a coil compression spring 24 is disposed. Obviously, the application of any other type of the spring such as wave spring, etc. is equally possible. Further the valve system 17a comprises a retaining nut 25a screwed over the external thread 14 of the piston rod 4 end and a substantially rigid, flat, floating plate 26a in a form of a disc, disposed between the spring and the second abutment surface 27 which is formed on the flange of the retaining nut 25a. In this embodiment, only the retaining nut 25a secures all elements of the valve system 17a which is screwed to the piston rod 4 and to this end the retaining nut 25a is provided with a torque application surface 251. The whole valve system 17a is delivered to an assembly line as a single unit with the retaining nut 25a press-fitted inside the internal socket 23 of the hollow main body 18a.

The spring 24 acts to bias the plate 26a to the second abutment surface 27, also in a plane substantially perpendicular to the damper longitudinal axis L, that is to the normally open position (cf. FIG. 2, right side), wherein the plate 26a is movable between said open position to allow free flow of liquid through the channels 20 of the hollow main body 18a and the first abutment surface 19, defining the close position of the system (cf. FIG. 2, left side) to substantially prevent or restrict the flow of liquid through said channels 20, allowing only a restricted flow through a number of equiangularly spaced passages 28a in the plate 26.

During the rebound stroke of the piston 7, the working liquid passes through the rebound valve assemblies 11 and 15 and the channels 20. Also during the compression stroke of the piston 7, within a predefined range of medium piston velocities, the working liquid passes freely through the compression valve assemblies 12 and 16 and the valve system 17a, which remain open. In other words the presence of the valve systems 17a does not interfere with the functionality of the valve assemblies 11 and 15 and with the functionality of the valve assemblies 12 and 16 in normal, comfort relevant operating range of piston velocities.

As shown on the left side of the drawing, after reaching a certain threshold of the piston velocity during the compression stroke, the pressure difference across the additional compression valve system 17a generates a pressure on the relatively large surface of the plate 26a, which pressure exceeds the pressure of the preloaded compression spring 24, leading to a displacement of the plate 26 towards the first abutment surface 19 formed on the face of the hollow main body 18a. During closing of the gap 29 between the plate 26a and the first abutment surface 19 (cf. FIG. 4), the flow resistance, and consequently the pressure difference across the valve system 17a increases, leading to even more rapid displacement of the plate 26 and a self amplifying behaviour of the valve system 17a. Separating the first abutment surface 19 into a radially inner portion 191 and a radially outer portion 192 ensures that the plate 26 remains flat while under pressure.

When the valve system 17a is in the closed position, the restricted flow of liquid takes place only through the passages 28a in the plate 26a leading to an increase of the damper force. When the piston 7 velocity diminishes below a selected level, the compression spring 24 lifts the floating disc 26a, again opening the main oil flow through the channels 20 of the hollow main body 18a.

Figure 4:
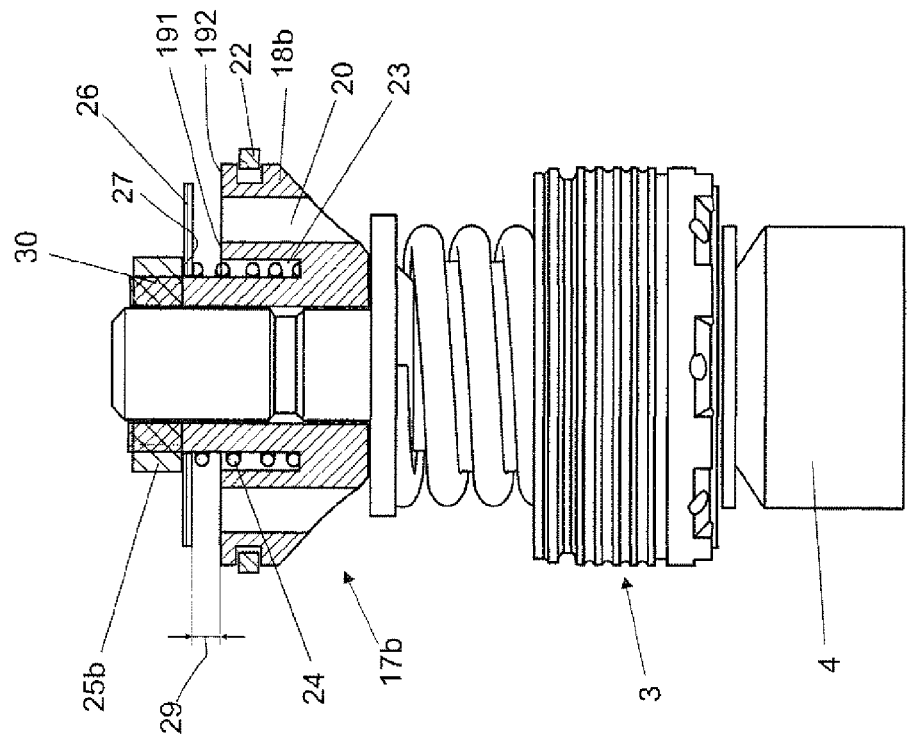
FIG. 4 is an enlarged cross-sectional view of another embodiment of the additional valve system.
Figure 5:
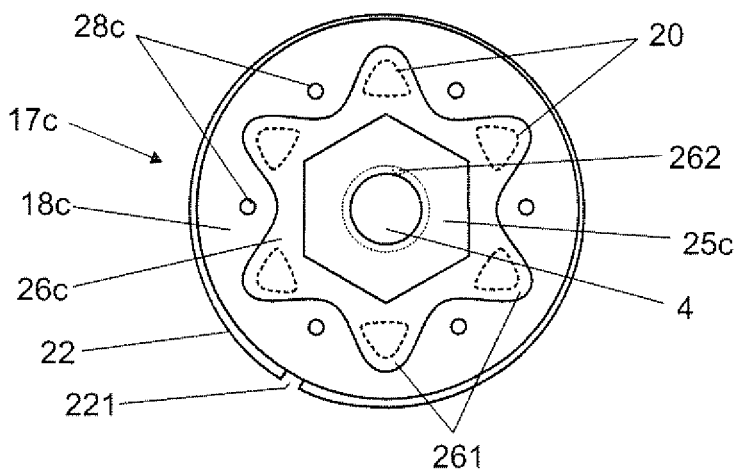
FIG. 5 shows a top view of an alternative embodiment of the movable plate of the additional valve system.
Figure 6:
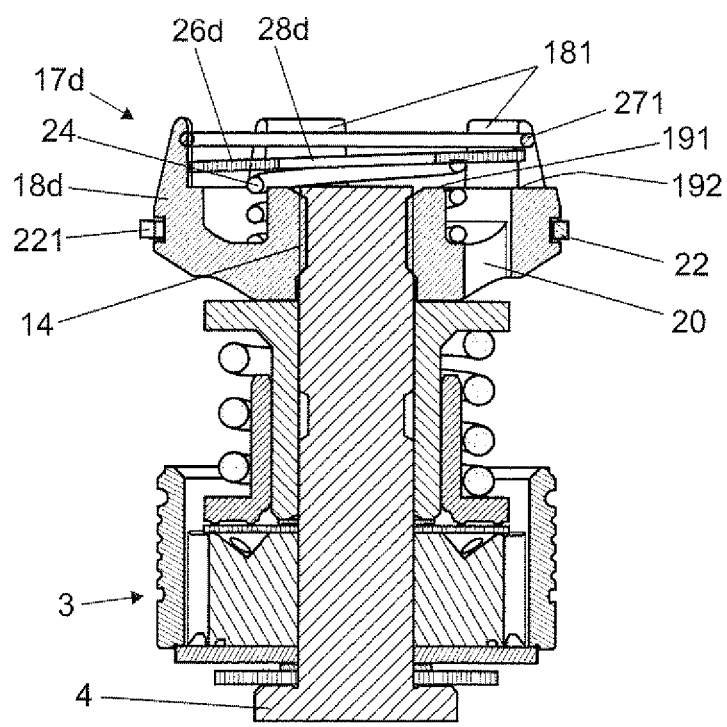
FIG. 6 is an enlarged cross-sectional view of yet another embodiment of the additional valve system.

FIGS. 4-6 illustrate other exemplary embodiments of the additional valve system according to the present invention wherein the reference numerals of the same functional elements remain the same as in FIG. 1, with suffixes (a-d) changed where appropriate to distinguish particular elements of the same functionality but different design.

Reference is now made to FIG. 4 showing the second embodiment of the additional valve system 17b, where the hollow main body 18b has an axial projection provided with an external thread 30 on which the retaining nut 25b forming the second abutment surface 27 is screwed. In this embodiment the hollow main body 18b is provided with appropriate means to attach the valve system 17b the piston rod 4 end.

FIG. 5 shows a top view of an alternative embodiment of the additional valve system 17c, where the movable plate 26c has the star-shaped outline forming six radially extending sections 261 located above the inlets of six channels 20 in the hollow main body. In the closed position of the valve system 17c, the sections 261 cover the inlets of the channels 20, above which they are located enabling the working liquid to flow only through the remaining uncovered channels 28c located between each pair of sections 261. The plate 26c is also provided with an inner radial projection 262 disposed slidably in the corresponding groove in the retaining nut 25c, which prevent the rotation of the plate 26c around the damper longitudinal axis L, which might lead to wrong orientation of the sections 261 with respect to the inlets of the corresponding channels 20 and/or 28c.

FIG. 6 shows yet another embodiment of the additional valve system 17d, in which the second abutment surface 27 is defined by a ring 271 fixed and supported by five radially external axial projections 181 of the hollow main body 18d. In an alternative embodiment the second abutment surface may also be formed directly by axial projections 181 provided with appropriate protrusions or by a circumferential flange of the hollow main body. In such a case the disc would be fitted in place by a snap lock connection.

The design parameters of the valve system 17 by means of which one may set the velocity threshold, the reaching of which triggers its operation, are the area of the pressure actuated surface of the plate 26, the force of the compression spring 24 and the width of the gap 29 (cf. FIG. 4) which should be large enough to create only minimal flow restriction in normal operating range of the damper. Since the mass of the plate 26 is small, the impact forces on the first and the second abutment surfaces 19, 27 shall not lead to the system failure or noise generation.

The design parameters influencing the behaviour of the valve system 17 after reaching the engaging velocity are the number and the shape (e.g. diameter) of the passages 28 in the plate 26, the hollow main body 18 and/or other components of the valve system 17, where the passages may be additionally or alternatively envisaged.

The application of the plate 26 yields beneficially low mass to surface ratio, which in turn affects among others the time delay of the valve response (low inertia of the plate 26) and durability of the valve system 17, as the impact forces accompanying the valve system operation are small. Moreover, the annular area between the plate 26 and the inner surface 8 of the tube 2 is large enough not to create any substantial restrictions for the flow of working liquid.

All the above features ensure that the working characteristic of the valve system remains substantially the same within a large range of dimensional tolerance of its components and even some eccentricity in the axial displacement of the hollow main body or plate with regard to the damper axis is fairly acceptable. Therefore their production specific losses are minimized and the cost of large scale production of the valve system is substantially decreased.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A hydraulic damper (1) for a motor vehicle suspension damper, comprising:
   a tube (2) filled with working liquid and having an inner surface (8) to define an inner diameter of the tube (2);
   a piston rod (4) disposed within said tube and extending along a damper longitudinal axis (L);
   a piston assembly (3) attached to said piston rod (4) and disposed in abutting relationship with said inner surface (8) of said tube (2) to divide said tube (2) into a rebound chamber (9) and a compression chamber (10);
   an additional compression valve system (17) attached to said piston rod (4) and disposed in said compression chamber (10);

said additional compression valve system (17) including a hollow main body (18) surrounding the piston rod (4) having an outside diameter less than said inner diameter of said tube (2);

said hollow main body (18) defining an annular groove (21) extending inwardly from said outside diameter;

a ring (22) disposed within said annular groove (21) and self-biased in abutting relationship with said inner surface (8) of said tube (2) to seal said hollow main body (18) within said tube (2) and form a sliding fit therebetween;

said ring including a cross cut (221) to allow displacement of said ring (22) within said annular groove (21) along a plane extending perpendicular to said damper longitudinal axis (L);

said annular groove having a top wall, a bottom wall, and a side wall extending between said top and bottom walls in continuous parallel relationship with said damper longitudinal axis (L); and said ring (22) disposed in spaced relationship with said side wall of said annular groove (21) to define a gap extending continuously between said sidewall of said annular groove (21) and said ring (22) and disposed in isolated relationship with said rebound chamber (10).

2. The hydraulic damper (1) according to claim 1, wherein said additional compression valve system (17) has a form of a preassembled add-on device.

3. The hydraulic damper (1) according to claim 2, wherein the hollow main body (18d) is provided with a radially external axially projecting wall (181) surrounding the plate (26) and provided with means (271) defining the second abutment surface (27).

4. The hydraulic damper (1) according to claim 2, wherein said plate (26c) is provided with a number of radially extending sections (261) located above a number of inlets of said channels (20) of the hollow main body (18c).

5. The hydraulic damper (1) according to claim 1 further comprising:

said hollow main body (18) having a first abutment surface (19);

said hollow main body (18) defining at least one channel (20) extending through said hollow main body (18);

a retaining nut (25) having a second abutment surface (27) attached to said piston rod (4);

a plate (26) disposed between said first abutment surface (19) of said hollow main body (18) and said second abutment surface (27) of said retaining nut (25); and a compression spring (24) disposed between said first abutment surface (19) of said hollow main body (18) and second abutment surface (27) of said retaining nut (25) for biasing said plate (26) towards said second abutment surface (27).

6. The hydraulic damper (1) according to claim 5, wherein said plate (26) is movable between a closed position wherein said plate (26) is disposed in abutting relationship with said second abutment surface 27 and covers said at least one channel (20) for restricting the flow of working liquid through said additional compression valve system (17) and an open position wherein said plate (26) is disposed in spaced relationship with said second abutment surface (27) for allowing free flow of liquid through said at least one channel (20) of said additional valve compression system (17); and at least one of said plate (26) and said hollow main body (18c) provided with at least one passage (28a, 28b, 28c, 28d) for allowing a flow of working liquid through said additional valve compression system (17) when said plate (26) is disposed in said closed position.

7. The hydraulic damper (1) according to claim 5, wherein said piston rod (4) includes an external thread (14) and said additional compression valve system (17) is screwed on said external thread (14) for securing said additional compression valve system (17) and said piston assembly (3).

8. The hydraulic damper (1) according to claim 7, wherein at least one of said retaining nut (25) and said hollow main body (18d) is provided with a torque application surface (251, 182).

9. The hydraulic damper (1) according to claim 5, wherein said hollow main body (18) defines an internal socket (23) and said compression spring (24) is disposed within said internal socket (23).

10. The hydraulic damper (1) according to claim 5, wherein said at least one channel (20) extends in spaced and parallel relationship to said damper longitudinal axis (L).

11. The hydraulic damper (1) according to claim 1 wherein said piston assembly (3) includes a compression valve assembly (12) and a rebound valve assembly (11).

* * * * *